No. 740,346. PATENTED SEPT. 29, 1903.
D. S. WILLIAMS.
MACHINE FOR MAKING PIES.
APPLICATION FILED JUNE 4, 1903.
NO MODEL. 5 SHEETS—SHEET 1.
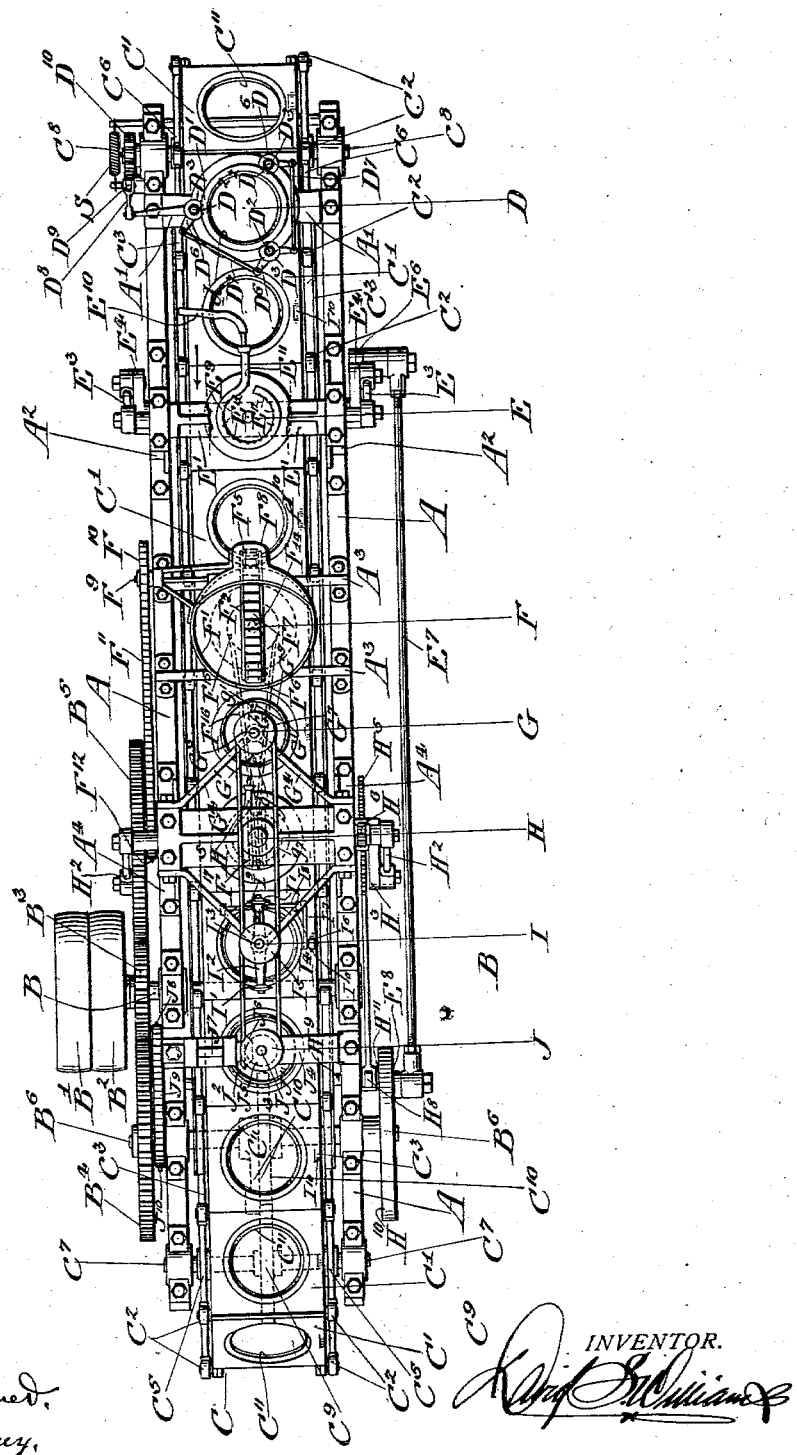

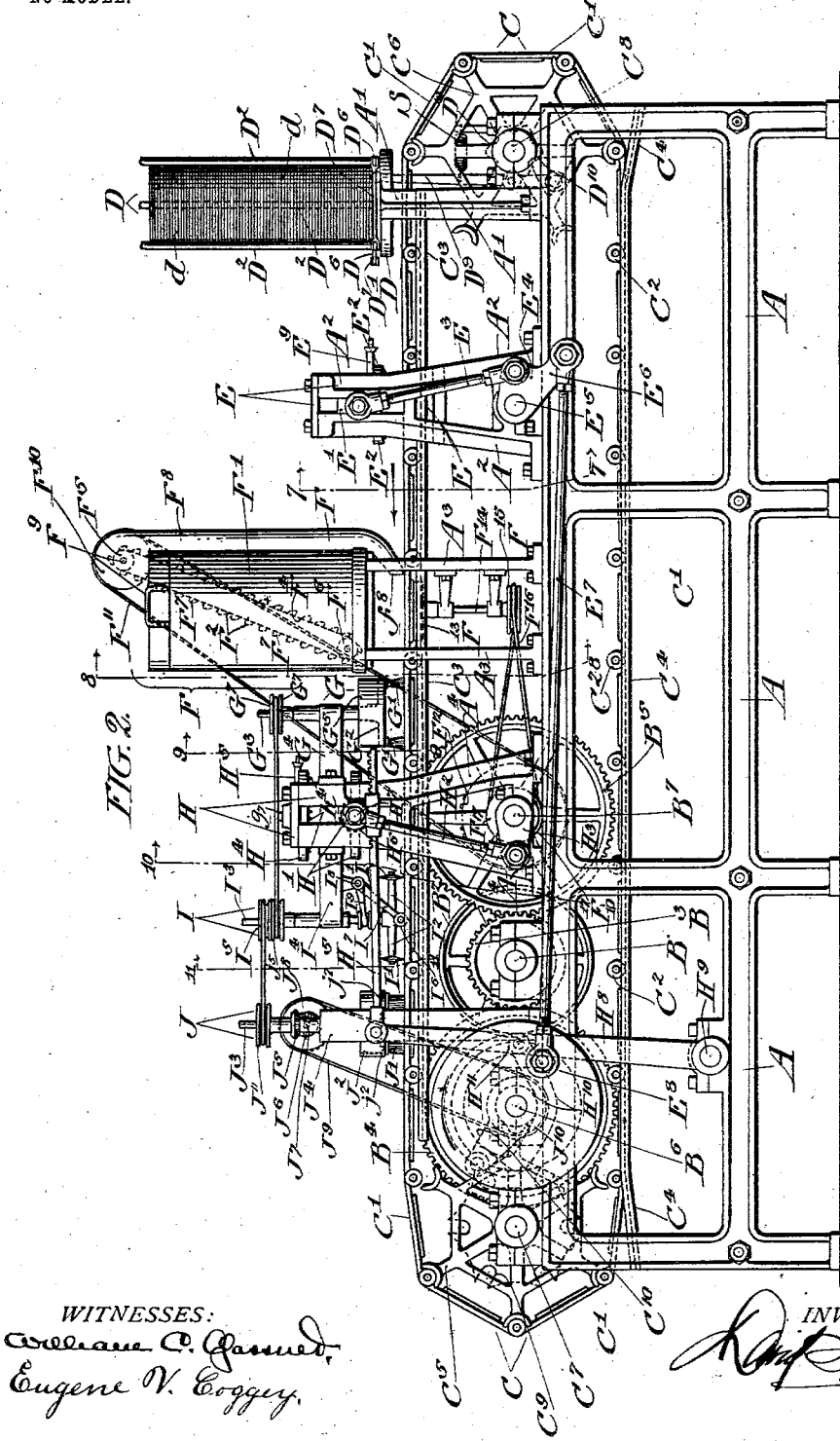

No. 740,346. PATENTED SEPT. 29, 1903.
D. S. WILLIAMS.
MACHINE FOR MAKING PIES.
APPLICATION FILED JUNE 4, 1903.
NO MODEL. 5 SHEETS—SHEET 3.
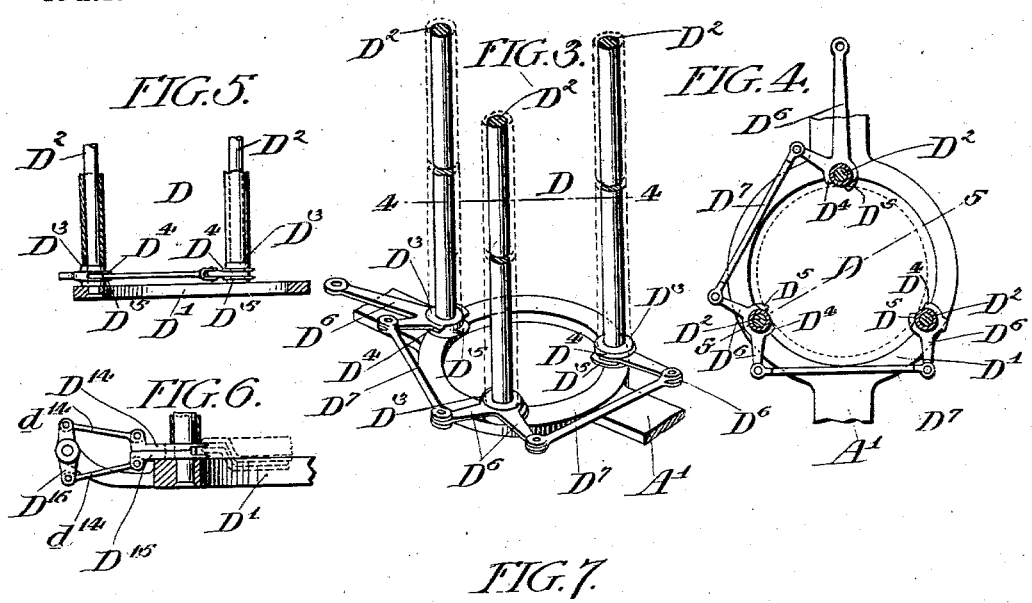
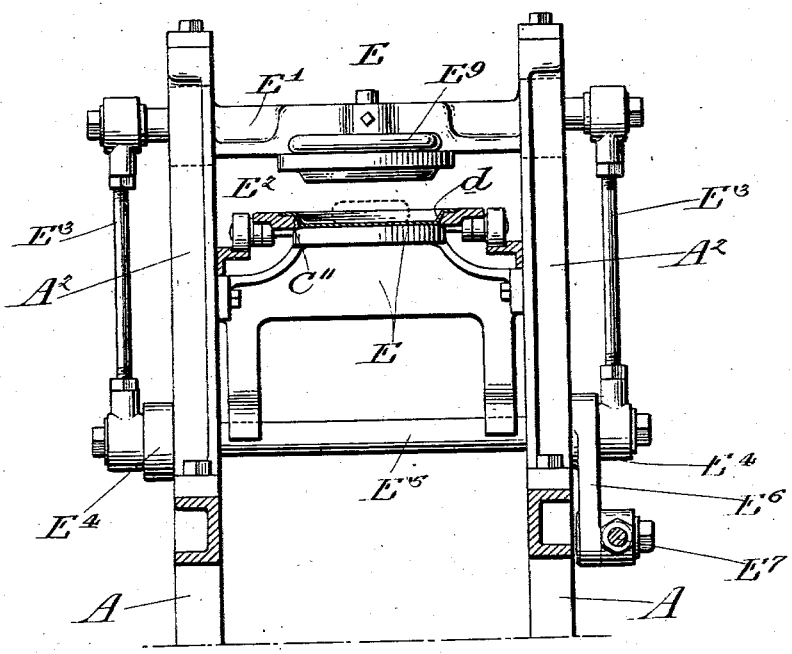
WITNESSES: INVENTOR.

No. 740,346. PATENTED SEPT. 29, 1903.
D. S. WILLIAMS.
MACHINE FOR MAKING PIES.
APPLICATION FILED JUNE 4, 1903.
NO MODEL. 5 SHEETS—SHEET 4.

WITNESSES: INVENTOR.

No. 740,346. PATENTED SEPT. 29, 1903.
D. S. WILLIAMS.
MACHINE FOR MAKING PIES.
APPLICATION FILED JUNE 4, 1903.
NO MODEL. 5 SHEETS—SHEET 5.
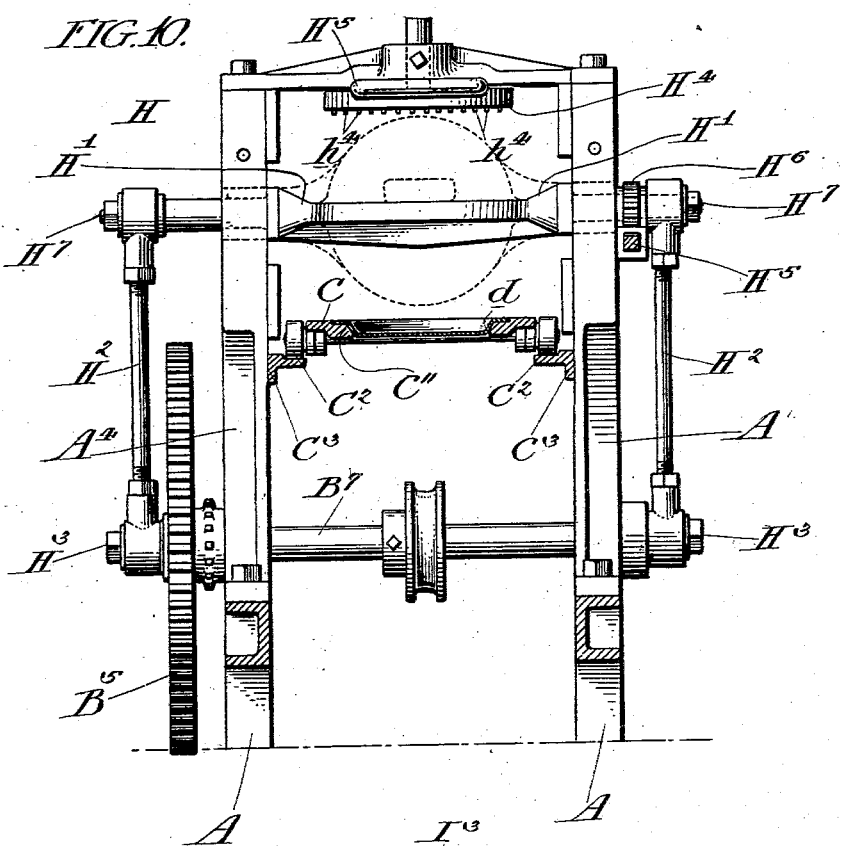
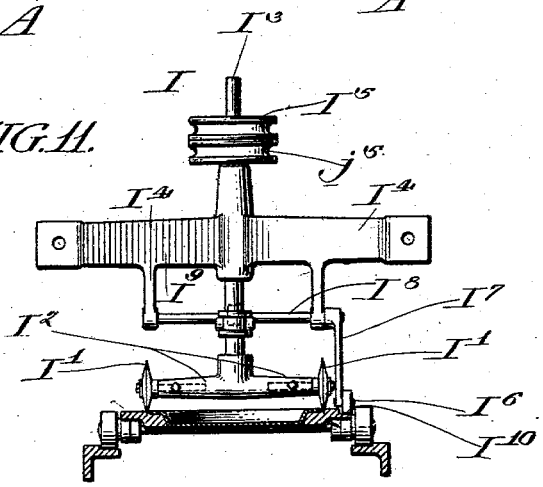
WITNESSES:
INVENTOR.

No. 740,346.

Patented September 29, 1903.

UNITED STATES PATENT OFFICE.

DAVID S. WILLIAMS, OF PHILADELPHIA, PENNSYLVANIA, ASSIGNOR TO JOSEPH C. HUTCHISON, OF PHILADELPHIA, PENNSYLVANIA.

MACHINE FOR MAKING PIES.

SPECIFICATION forming part of Letters Patent No. 740,346, dated September 29, 1903.

Application filed June 4, 1903. Serial No. 160,081. (No model.)

*To all whom it may concern:*

Be it known that I, DAVID S. WILLIAMS, a citizen of the United States, residing at Philadelphia, in the county of Philadelphia and State of Pennsylvania, have invented certain new and useful Improvements in Machines for Making Pies, of which the following is a specification.

My invention embodies a machine for making pies in a manner that will not tend to toughen the dough and in which the finished product will be cheaper, more uniform in quality, and shorter in texture, and consequently better, than the product made by the rolling process.

In carrying out my invention I employ an endless conveyer made up of a number of sections provided with openings to receive the plates. The plates or pans are automatically fed to the conveyer, and each as it passes along is provided with a thick lump or cake of dough, which is brought under the action of a heated plunger and is pressed into the shape desired to be given to the lower crust. The crust thus formed is then carried to the filling mechanism, where the requisite amount of fruit or meat is evenly distributed over its surface. Following this operation and prior to the forming of the upper sheet of crust the outer edge of the lower crust is moistened to cause the upper crust to adhere to it, and by the mechanism next employed the top crust is pressed into shape, perforated, and pressed upon the lower crust, after which the irregular edges are trimmed off, the top sized, and the product is ready for baking.

The nature of my improvements will be more clearly understood by reference to the accompanying page of drawings, in which—

Figure 8:
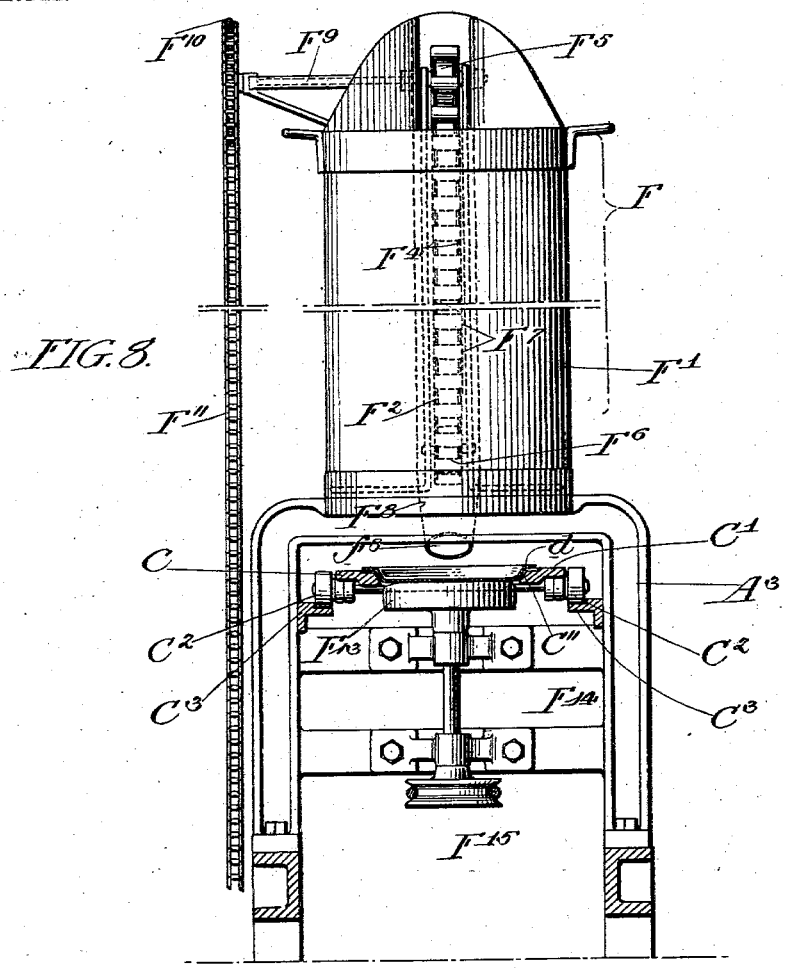
Figure 9:
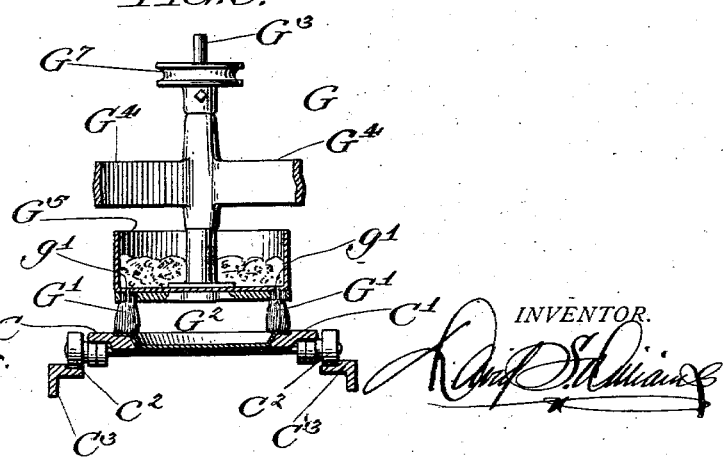

Figure 1 illustrates a plan view of a machine constructed in accordance with my invention. Fig. 2 represents a side elevation of the same. Fig. 3 is a detached perspective view of a portion of the plate-feeding mechanism, showing more clearly the manner in which the plates are released. Fig. 4 denotes a sectional plan of the plate-feeding mechanism, taken on a line 4 4 of Fig. 3. Fig. 5 represents a vertical section taken on a line 5 5 of Fig. 4. Fig. 6 is a similar view modified to show the manner in which slidable plates may be employed in place of the ring form shown in Figs. 3, 4, and 5. Fig. 7 indicates a vertical section of the lower-crust-forming mechanism, taken on a line 7 7 of Fig. 2. Fig. 8 shows a vertical section of the filling mechanism, taken on a line 8 8 of Fig. 2. Fig. 9 denotes a vertical section of the moistening mechanism, taken on a line 9 9 of Fig. 2. Fig. 10 illustrates a vertical section of the top-crust-forming mechanism, taken on a line 10 10 of Fig. 2; and Fig. 11 represents a similar vertical section of the trimming mechanism, taken on a line 11 11 of Fig. 2.

Referring in general to the reference-letters of the drawings, A denotes the frame of the machine; B, the main driving-shaft; C, the endless conveyer; D, the plate-feeding mechanism; E, the lower-crust-forming mechanism; F, the filler mechanism; G, the moistening mechanism; H, the upper-crust-forming mechanism; I, the trimming mechanism, and J the mechanism for sizing the top crust.

Considering the parts in detail, the main driving-shaft B is provided, respectively, with fast and loose driving-pulleys $B'$ and $B^2$ and with a small gear wheel or pinion $B^3$, which meshes with gear-wheels $B^4$ and $B^5$, mounted, respectively, on shafts $B^6$ and $B^7$.

The endless conveyer C is made up of a number of links $C'$, which are hinged together and have at this point rollers $C^2$, which rest upon rails $C^3$ and $C^4$ during the greater part of their travel and are carried at each end of the machine by sprocket-wheels $C^5$ and $C^6$, mounted upon shafts $C^7$ and $C^8$.

The shaft $C^7$, by which the conveyer C is driven, is provided with a star-wheel $C^9$, operated by a corresponding ratchet member $C^{10}$, mounted upon the shaft $B^6$.

The links or sections $C'$ of the conveyer are each provided with an opening $C^{11}$, cut out in such a manner as to closely embrace and form an outer wall for the plates to be deposited therein, as well as to form a ledge to engage the top flange of the plate.

The plate-feeding mechanism D comprises a frame $A'$, upon which is fastened a baseplate $D'$, from which project guides or uprights $D^2$, between which the plates $d$ are supported. Each guide is provided with an escapement-ring $D^3$, which has two mutilated rings $D^4$ and $D^5$, arranged in such a manner that the upper ring will engage the rim of the plate adjacent to the one at the bottom before the lower ring releases its hold upon the lower plate and it is allowed to drop to the conveyer C.

The rings $D^3$ have united to them bell-crank levers $D^6$, which are joined together by connecting-rods $D^7$, the last bell-crank lever of the series being connected by a link $D^8$ to a lever $D^9$, which is operated in one direction by a cam $D^{10}$ on the shaft $C^8$ and in the other direction by a spring S.

The conveyer C after receiving a plate is carried forward one step, and the plate is then supplied with a thick cake of dough of considerably less diameter than the crust it is to form. In practice I prefer to feed the plates from the belt of a single-stamp cake-cutting machine; but as this does not form any part of my present invention I will proceed to describe the operation as it would be carried out after manually placing a cake of dough into the plate. As the conveyer is again moved forward in the direction of the arrow the dough is brought under the action of the lower-crust-forming mechanism E. This machine comprises supporting-frames $A^2$, between which is firmly supported a bed-plate E, arranged in line with the bottom of the plate $d$, and a cross-head $E'$, carrying a plunger $E^2$, which latter is of the same contour as the plate. The cross-head $E'$ is guided in the upper part of the frame $A^2$ and is operated by connecting-rods $E^3$, studded to cranks $E^4$, which are firmly mounted upon a shaft $E^5$. One of the cranks $E^4$, as shown in Fig. 2, is in the form of a bell-crank and has a long arm $E^6$, to which is fulcrumed a long rod $E^7$, which receives motion from a crank $E^8$, mounted upon the shaft $B^6$. The method of pressing the dough into the plate $d$ to form the lower crust as distinguished from the method of rolling out a sheet of dough and then placing it upon the plate has distinct advantages, for aside from being a quicker operation it has the advantage of producing a shorter crust, or, in other words, a crust which is when baked exceedingly light and tender. In the course of my experiments this method was at first attended with difficulties, the chief of which was the tendency of the pie-dough, which is very sticky, to adhere with great tenacity to the upper die or plunger, and in order to overcome this gauze aprons dusted with flour and other like expedients were tried with varying degrees of success. I find, however, that this may be best accomplished by heating the plunger by a coiled steam-pipe, or, as I have shown, by means of a gas-burner $E^9$, having a gas-supply pipe $E^{10}$, an air and gas mixing tube $E^{11}$, and a series of gas-jets $E^{12}$. By this means a portion of the lard contained in the dough is melted, which, spreading over the surface of the plunger, acts to prevent the dough from sticking. The next operation is performed by the filling mechanism F, which comprises a receptacle or tank $F'$, mounted upon standards $A^3 A^3$ and provided with a conveyer $F^2$, consisting of a chain $F^4$, passing over sprocket-wheels $F^5$ and $F^6$ and carrying a number of small buckets $F^7$, which deliver the contents of the receptacle to a chute $F^8$. The conveyer is driven from the shaft $F^9$ by a sprocket-wheel $F^{10}$, which is provided with a sprocket-chain $F^{11}$, receiving its motion from a sprocket-wheel $F^{12}$, mounted on the shaft $B^7$. The plate $d$ upon reaching this point of the operation is slightly raised by riding over a turn-table $F^{13}$, which releases the plate from engagement with the conveyer C and enables it to be turned through the medium of the shaft $F^{14}$, having a pulley $F^{15}$, driven by a belt $F^{16}$, carried by a pulley $F^{17}$, mounted upon the shaft $B^7$. The mouth of the chute $f^8$ is located at one side of the center of the plate containing the lower crust, so that as it is turned by the turn-table $F^{13}$ the fruit or other material fed to it will be evenly distributed. In some grades of pies, as is well known, a top crust is omitted, and in making this class of work all of the following operations except the trimming mechanism may be temporarily thrown out of action.

Before applying the top crust to the edge of the lower crust I prefer, although it is not in all cases necessary, to moisten by a mechanism G the rim of the lower crust, which is accomplished by brushes $G' G'$, mounted upon an arm $G^2$, which is carried by a vertical shaft $G^3$, journaled in a frame $G^4$ and driven by a pulley $G^7$. The brushes $G'$ are moistened by tubes $g' g'$, leading therefrom to a pan $G^5$, into which water or other moistening fluids may be slowly caused to drop, or, as shown, it may be provided with a sponge or other porous medium, from which the water may be slowly fed to the tubes.

The upper-crust-forming mechanism H comprises upright frames $A^4$, in which is guided a cross-head $H'$, upon which a cake of dough intended to form the upper crust may be placed. This cross-head is caused to move up and down by means of connecting-rods $H^2$, which are pivoted to the cross-head and receive their motion from cranks $H^3$, secured to the shaft $B^7$. After receiving the dough the cranks and arms associated therewith carry the cross-head upward, where the dough is brought in contact with a plate $H^4$ and pressed to the thickness desired to form the crust. The plate $H^4$ is provided with a gas-burner $H^5$, similar to that employed in connection with the lower-crust-forming mechanism E, with the object of preventing the dough from adhering to the plate $H^4$. The plate $H^4$ is also provided with small pins $h^4$, which serve to perforate the crust or to otherwise mark it for the purpose of designating the character of the goods. The cross-head $H'$ on its downward movement is caused to turn a half-revolution by means of a rack $H^5$, operating a pinion H⁶, which is fastened to one of the trunnions H⁷ of the cross-head, so that a further downward movement of the cranks will cause the crust to be delivered to the plate containing the lower crust, which having been previously moistened around the upper edge will cause the upper crust to adhere to it and permit the cross-head to rise, leaving the sheet of dough in contact with the lower crust. The rack H⁵, which causes the cross-head to turn, is connected to and operated by a lever H⁸, supported upon a shaft H⁹ and operated by a cam H¹⁰, engaging the cam-roller H¹¹. The next operation is that of trimming or cutting away the irregular edges of the crusts which project outside of the pie-plate, which is accomplished by means of circular cutters I' I', constituting a portion of the trimming mechanism I. The cutters I' are journaled upon the ends of an arm I², which is mounted upon a shaft I³, carried by a bracket I⁴ and driven by a pulley I⁵ by means which will later on be described. The shaft I³, which supports the cutters, is lifted out of the path of the crusts during the time the conveyer C is in motion by a roller I⁶, bearing upon the face of the conveyer-belt. This roller is connected to an arm I⁷, mounted on a shaft I⁸, which carries another arm I⁹, yoked to the shaft I³. When, however, the belt C has moved forward and again stopped, the cutters are brought into action to trim the crust by the roller I⁶ dropping into a depression I¹⁰, one of which is located on a line central with the plate in each section of the conveyer, and as the roller I⁶ falls the cutters I' are brought into a position to perform the trimming operation.

The last operation consists in glazing the top crust, which is performed by a mechanism J, consisting of a rotary brush J', which is fed with milk or other glazing fluid contained in a reservoir J² through perforations $j^2$, arranged between the bottom of the reservoir and the top of the brush. The fluid used for this purpose may be prevented from flowing too rapidly to the brush by means of sponges or other absorbents placed in the reservoir J², or, if desired, the fluid may be fed to the reservoir by a small pipe and regulated by a valve in any well-known way to limit the quantity delivered in a given time. The brush J' and reservoir J² are mounted upon a shaft J³, which is supported in a frame J⁴, and motion is given to the shaft and parts carried by it by a bevel-gear J⁵, meshing with a bevel-pinion J⁶ on a shaft J⁷, which shaft is driven by a sprocket-wheel J⁸ through the medium of a sprocket-chain J⁹ and another sprocket-wheel J¹⁰, mounted upon the shaft B⁶. The driving-shafts of both the mechanisms G and I receive their power through the mechanism J, which has a pulley J¹¹ mounted upon its driving-shaft J³ and which carries a belt running from it to a pulley I⁵, driving the trimming mechanism. On the shaft I³ is another pulley $j^5$, which conveys power through the medium of a belt $g^7$ to the pulley G⁷ on the shaft G³.

It will be seen from the nature of my invention that I do not limit myself specifically to the mechanism by which the several operations of my machine are carried out, except in such of the claims as it has been thought advisable or necessary to point out such specific mechanism, and it is obvious that many mechanical equivalents other than those shown may be adapted without departing from the spirit of my invention.

Having described my invention, what I claim, and desire to secure by Letters Patent, is—

1. A machine for making pies, comprising a conveyer mechanism fitted to receive pie-plates, a plunger mechanism adapted to coact with a plate in the conveyer to form the lower crust, a filler mechanism and a mechanism adapted to form and deliver an upper crust, substantially as described.

2. A machine for making pies, comprising a conveyer mechanism fitted to receive pie-plates, a plunger mechanism adapted to coact with a plate in the conveyer to form a crust, a device for heating said plunger, and a mechanism for filling the crust, substantially as described.

3. A machine for making pies, comprising a conveyer mechanism fitted to receive pie-plates, a plunger mechanism adapted to coact with a plate in the conveyer to form the lower crust of the pie, a device for heating said plunger, a mechanism for supplying the crust with a filler, a mechanism adapted to form and to deliver an upper pie-crust and a device for heating the parts of the top-crust-forming mechanism, substantially as specified.

4. A machine for making pies, comprising a conveyer mechanism fitted to receive pie-plates, a plunger mechanism adapted to coact with a plate in the conveyer to form a pie-crust, a filler mechanism and a device for turning the crust as it is being filled, substantially as specified.

5. A machine of the character specified, comprising an endless belt or conveyer formed of a series of linked members for holding pie-plates, a mechanism for operating the conveyer, a plunger mechanism acting in conjunction with the plate to form the lower crust, a fruit-receptacle and filler mechanism and a mechanism to press and apply a top crust to the pie, substantially as described.

6. A machine for making pies, comprising an endless conveyer formed of a number of linked members provided with openings to hold pie-plates, means for operating the conveyer, a mechanism for supporting a number of plates and for delivering the same one at a time to the conveyer members, a plunger mechanism adapted to act with a plate in the conveyer to form the lower crust, a reservoir and filler mechanism to supply and deliver a filler to the lower crust and a mechanism to press and apply a top crust to the pie, substantially as described.

7. A machine for making pies, comprising an endless conveyer composed of links each having an opening for the reception of a pie-plate, a mechanism having an intermittent motion to operate the conveyer, a mechanism for holding a number of pie-plates and for delivering them one at a time to the conveyer, a plunger mechanism adapted to coact with a plate in the conveyer to form the lower crust, a reservoir and filler mechanism to supply and deliver fruit to the lower crust, a mechanism to moisten the rim of the lower crust, and a mechanism to form and apply a top crust to the pie, substantially as specified.

8. A machine for making pies, comprising an endless conveyer mechanism composed of members fitted to receive pie-plates and to cause the members to operate with an intermittent motion, a mechanism for holding a number of pie-plates and for delivering them one at a time to the conveyer members, a plunger mechanism adapted to coact with a plate in the conveyer to form the lower crust, a reservoir and filler mechanism to supply and to deliver fruit to the lower crust, and a mechanism to press, perforate and deliver an upper crust to the pie, substantially as described.

9. A machine for making pies, comprising an endless conveyer composed of linked members fitted to receive pie-plates, a mechanism for holding a number of pie-plates and for delivering them one at a time to the conveyer, means for feeding a cake of dough to the plates carried by the conveyer, a plunger mechanism adapted to coact with a plate to form the lower crust of the pie, a reservoir and filler mechanism to supply and deliver fruit to the lower crust, a mechanism to distribute the fruit as it is being delivered and a mechanism to form and deliver a top crust to the pie, substantially as described.

10. A machine for making pies comprising an endless conveyer composed of members fitted to receive pie-plates, a mechanism for holding a number of plates and for delivering them one at a time to the conveyer, means for feeding a lump of dough to the conveyer, a plunger mechanism adapted to coact with a plate to form the lower crust of the pie, a reservoir and filler mechanism to supply and deliver a filler to the lower crust, a mechanism for moistening the rim of the lower crust, a mechanism to form and deliver a top crust to the pie and a mechanism for trimming the edges of the crusts, substantially as described.

11. A machine for making pies, comprising an endless conveyer composed of members fitted to receive pie-plates, a mechanism for holding a number of pie-plates and for delivering them one at a time to the conveyer, means for supplying the plates carried by the conveyer with dough, a plunger mechanism adapted to coact with a plate to form the lower crust of the pie, a reservoir and filler mechanism to supply and deliver a filler to the pie-crust, a mechanism to form, perforate and deliver a top crust to the pie, a mechanism for trimming the edges of the crusts and a mechanism for glazing the top crust, substantially as specified.

12. A machine for making pies, comprising an endless conveyer fitted to receive pie-plates, a mechanism for supporting and delivering plates to the conveyer, a mechanism for feeding the crust-making material, a plunger mechanism adapted to form a pie-crust within the plate delivered to the conveyer, a reservoir and filler mechanism to supply and deliver a filler to the crust, a mechanism for turning the crust as the filler is being fed to it, a mechanism for moistening the top of the crust, a mechanism to feed material to form a top crust, a mechanism to form, perforate and deliver a top crust to the pie, a mechanism to cut and trim the edges of both of the crusts and a mechanism for glazing the top crust, substantially as described.

13. A machine for making pies, comprising an endless conveyer fitted to receive pie-plates, a plate-delivery mechanism, a dough-feeding mechanism, a plunger mechanism to form the lower crust, a device for heating the plunger, a reservoir and filler mechanism, a mechanism for distributing the filler, a mechanism for moistening the rim of the crust, a mechanism to feed material to form a top crust, a mechanism comprising a fixed and movable die to press, perforate and deliver a top crust to the pie, a device for heating the upper die of said mechanism, a mechanism for trimming the edges of the crusts and a mechanism for glazing the top of the pie, substantially as specified.

In testimony whereof I affix my signature in presence of two witnesses.

DAVID S. WILLIAMS.

Witnesses:
WILLIAM C. GASSUED,
ARNOLD KATZ.